July 13, 1943.   F. C. WAPPLER   2,324,444
OPTICAL INSTRUMENT
Filed April 16, 1941   3 Sheets-Sheet 1

INVENTOR:
FREDERICK C. WAPPLER.
BY Gluck & Breitenfeld
ATTORNEYS

July 13, 1943.　　　F. C. WAPPLER　　　2,324,444
OPTICAL INSTRUMENT
Filed April 16, 1941　　　3 Sheets-Sheet 2

INVENTOR.
FREDERICK C. WAPPLER.
BY

July 13, 1943.   F. C. WAPPLER   2,324,444
OPTICAL INSTRUMENT
Filed April 16, 1941   3 Sheets-Sheet 3

INVENTOR.
FREDERICK C. WAPPLER
BY Gluck & Breitenfeld
ATTORNEYS

Patented July 13, 1943

2,324,444

UNITED STATES PATENT OFFICE 2,324,444

OPTICAL INSTRUMENT

Frederick Charles Wappler, New York, N. Y.

Application April 16, 1941, Serial No. 388,721

11 Claims. (Cl. 240—37)

The present invention relates generally to optical instruments, and has particular reference to the type of optical instrument which includes an electric lamp as a functional part thereof.

One of the objects of the invention is to provide a simplified means for replacing the lamp after it has burned out or become in any other way unsuitable for further use.

A more particular object of the invention lies in the provision of an arrangement whereby such lamp replacement may be effected with unusual speed and with a very minimum of effort on the part of the user.

While the invention is applicable to optical instruments generally, the ease and speed with which the lamp replacement can be effected makes it particularly useful for gun sights of the types shown in United States Patents 683,203 and 1,610,532. Where the aiming of a gun is dependent upon the continued functioning of an electric lamp associated with the gun sight, it is obviously of great importance that a replacement of a defective lamp be capable of accomplishment as quickly and expeditiously as possible.

In accordance with the invention, there is provided a specially-designed carrier for a plurality of lamps, and the carrier is arranged in a housing which permits movement of the carrier into predetermined different settings in each of which a different one of the lamps assumes an operative position. A means is provided for completing an electric circuit to whatever lamp occupies the operative position, and the user is thus enabled to effect a lamp replacement almost instantaneously by merely shifting the carrier from one setting to another.

The invention also provides an arrangement whereby the lamp carrier as a whole is retained in readily-releasable engagement with the housing, whereby a replacement of the carrier itself may be quickly accomplished by withdrawing it bodily from the housing and substituting another in its place.

Another object of the invention has particular reference to optical instruments of the type in which there is a marked screen or reticle to which access may be desired from time to time. It is one of the present purposes to provide certain improvements in the structural nature of such instruments whereby access to the screen or reticle may be more readily and quickly achieved than has been possible heretofore. This contributes toward standarization and economy of manufacture, and permits an optical instrument to be more feasibly adapted for slightly different uses, e. g., for different branches of the armed forces whose requirements call for different markings on the reticle itself.

A further object of the invention lies in the provision of an improved means for enabling the optical instrument to be releasably and adjustably secured to a supporting structure. A gun sight, for example, when installed in association with a gun, whether in an airplane or elsewhere, must be readily adjustable into predetermined alignment and disposition. In accordance with the present invention, there is provided a substantially cylindrical housing with a mounting ring that is longitudinally adjustable, and a means for releasably clamping the ring to the housing. The ring has an outer surface conforming to the surface of a sphere and the clamping means is arranged wholly within the confines of said spherical surface.

Because the various features of the invention are of particular utility in connection with a gun sight of the character hereinbefore referred to, I have chosen to illustrate my invention as it may be applied to a gun sight of that general type. It will be understood, however, that certain phases of my invention are not necessarily restricted to any such specific type of instrument and will have applicability to a wide variety of optical instruments generally.

I achieve the foregoing objects, and such other objects as may hereinafter appear or be pointed out, in the manner illustratively exemplified in the accompanying drawings in which.

Figure 4:
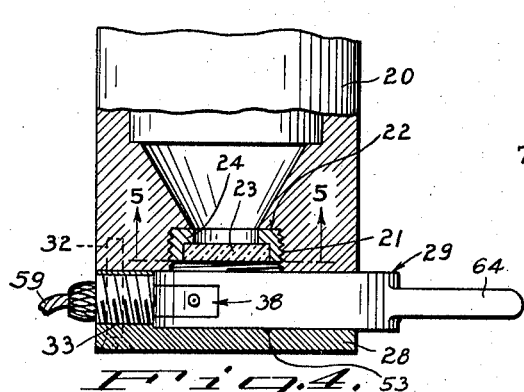
Figure 4 is a fragmentary longitudinal cross-section taken in substantially the same direction as Figure 1.
Figure 5:
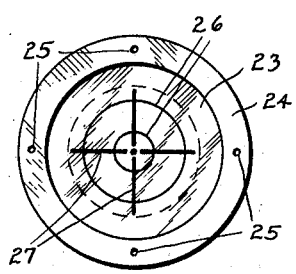
Figure 5 is a fragmentary view, on an enlarged scale, taken substantially along the line 5—5 of Figure 4.

In the optical instrument chosen for illustration herein, there is a substantially cylindrical housing 20 within which there is an electric lamp, a marked screen or reticle, and a system of collimating lenses. These parts are arranged along the optical axis of the instrument in a well-known manner whereby the rays from the lamp pass through the reticle and then through the lens system. In accordance with my invention, the housing is formed of two parts, a forward or body portion, and a separable back portion. The lens system is arranged in the forward region of the body portion, and the screen is arranged in the opposite end of the body portion. The lens system has not been shown in the present drawings, since it is well-known per se and has no direct bearing upon the present invention. The screen, however, is shown in Figures 4 and 5.

I have shown the rear end of the body portion 20 formed with an interiorly threaded bore 21, and with a rearwardly directed shoulder 22 at the inner end of this bore. The screen or reticle 23 is mounted in a frame 24 which is exteriorly threaded and is adapted to be screwed forwardly into the threaded bore 21, ultimately coming into abutment with the shoulder 22. In its rear face, the frame is provided with means for allowing engagement of the frame by means of a suitable tool, and I have illustratively chosen to show four small openings 25 with which a suitably shaped tool may cooperate.

The screen or reticle 23 has markings thereon which I have shown, for illustrative purposes, in the form of concentric circles 26 and a cross-like pattern 27. It will be understood that these markings may be of any suitable other kind or pattern, depending upon the purposes for which the gun sight is intended and upon the particular requirements of the branch of service under whose direction the gun sight is to be used.

Figure 8:
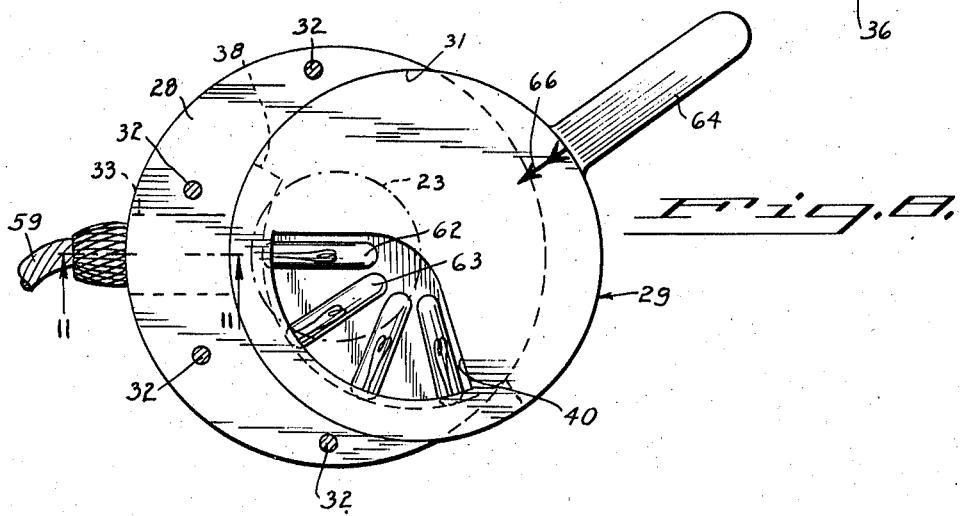
Figure 8 is a plan view of the removable back portion of the housing, showing the lamp carrier in position.
Figure 9:
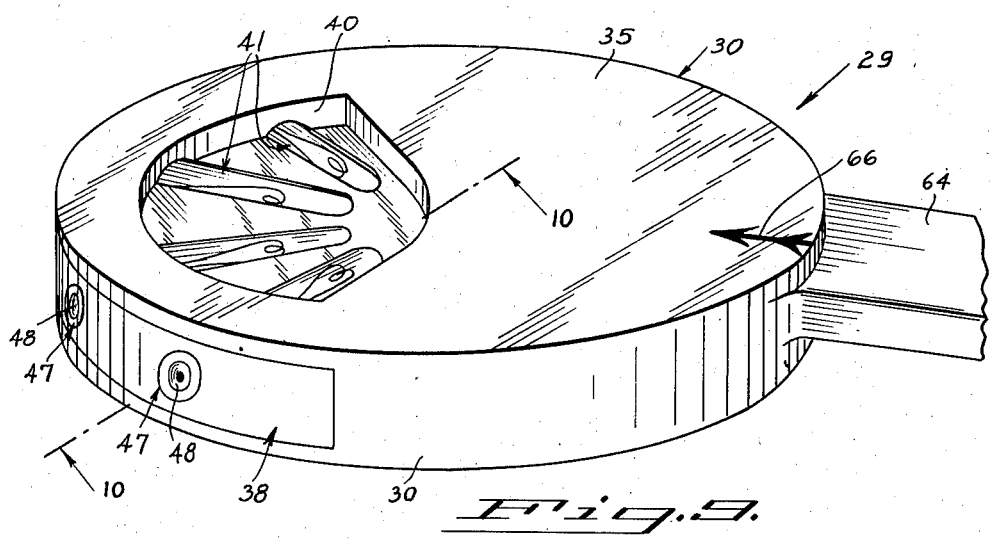
Figure 9 is a perspective view of the lamp carrier by itself.

The electric lamp is carried by the back portion 28 of the housing and is mounted in a carrier 29 (Figure 9). In the preferred embodiment of the invention, this carrier has a peripheral surface 30 of circular contour, and the back portion 28 of the housing is provided with a suitably shaped lateral recess adapted to accommodate this carrier. In the instrument illustrated, the back portion 28, when viewed from above, presents a crescent-shaped appearance (Figure 8), the recess having a wall 31 which conforms to the curvature of the periphery 30. This recess does not extend for the full depth of the portion 28, and there is thus provided a bottom wall which conforms substantially to the generally cylindrical contour of the entire housing. The recess may be said to have a floor or bottom surface 34 adapted to lie beneath the carrier 29.

The housing portion 28 is removably secured to the body portion of the housing by means of screws or studs 32, and I have illustratively shown four such elements in cross-section in Figure 8.

For a purpose presently to be described, the portion 28 is provided with a bore 33, preferably threaded, and preferably extending through the widest portion of the crescent. The bore 33 extends in a substantially radial direction from the external surface of the back portion 28 into communication with the recess within which the carrier is accommodated.

The details of the carrier construction are shown most clearly in Figures 6–10. The particular carrier which I have herein illustrated, and which has proven to have certain advantages in practice, is substantially disc-shaped, with parallel upper and lower surfaces 35 and 36 respectively. In the peripheral surface 30, and extending through an arc of predetermined extent, I form a channel or groove 37 which is ultimately adapted to accommodate an insert 38 of insulating material. Holes 39 are drilled into the carrier, in substantially radial directions, through the bottom wall of the groove 37. I have illustratively shown four such holes in Figure 6, and I have shown the groove 37 extending through a corresponding arc of approximately 120°. It will be understood, however, that there may be more or less of these holes, depending upon the number of lamps that are to be carried.

Figure 7:
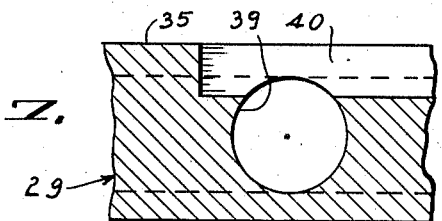
Figure 7 is a cross-sectional view, on an enlarged scale, taken substantially along the line 7—7 of Figure 6.

An opening 40 is provided in the upper face of the carrier, of such a depth that it will intersect the holes 39, as shown most clearly in Figure 7, thereby providing a series of spaced upwardly-opening lamp cradles. The width of each of these cradles, at the top, is preferably smaller than the diameter of each hole 39.

Figure 6:
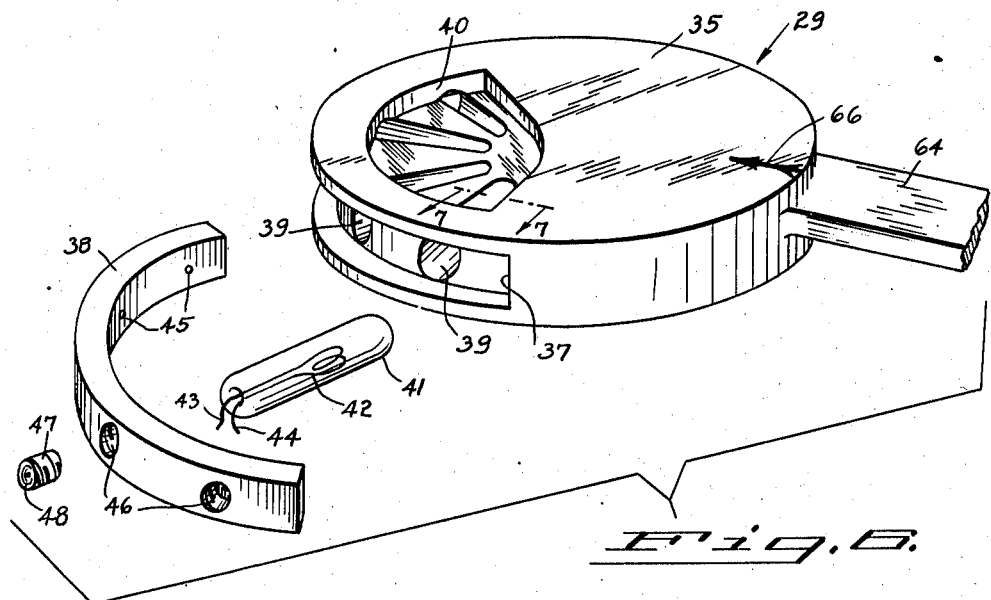
Figure 6 is an exploded view showing certain of the elements entering into the construction of the lamp carrier.

Into each of the holes 39 a lamp is inserted, and one such lamp is shown in Figure 6. It preferably assumes the form of a sealed elongated bulb 41 having rounded ends. Within the bulb is the usual lamp filament 42 and extending from one end of the bulb are the terminals 43 and 44.

Figure 10:
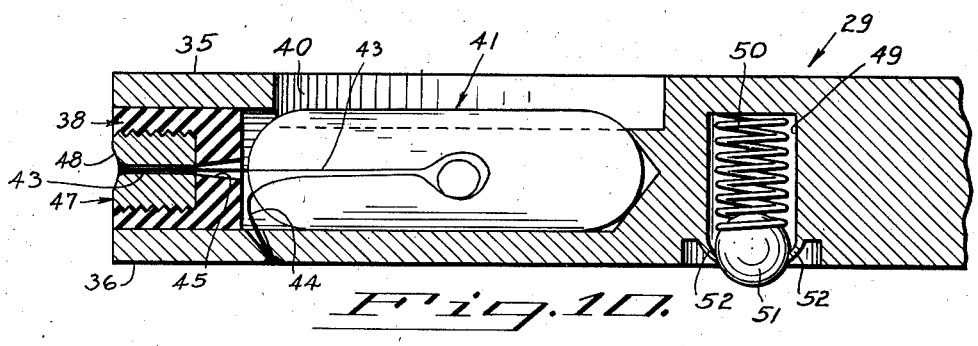
Figure 10 is an enlarged cross-sectional view taken substantially along the line 10—10 of Figure 9.

There are a variety of ways in which the terminals 43 and 44 may be connected with the other portions of the device to complete the electric circuits contemplated by the present invention. The preferred procedure is to ground one terminal of each lamp and to connect the other terminal to a live contact. For example, the terminal 44 may be passed through a small hole drilled through the bottom wall in the carrier into engagement with the corresponding hole 39, as shown most clearly in Figure 10. By making the carrier of metal, the terminal 44 may thus be brought into firm electrical connection with the carrier and with the instrument as a whole, thus grounding the terminal 44. The other terminal 43 may be threaded forwardly through a suitable opening 45 provided in the insulating insert 38. At its outer end, each opening 45 communicates with a larger opening or recess 46, preferably threaded. A metal contact 47 is adapted to be inserted into the recess 46, and if the latter is threaded, the contact 47 may also be advantageously threaded so as to allow it to be screwed into position as shown in Figure 10. Each contact element 47 has a longitudinal hole through which the terminal 43 may be brought and into which this terminal may be secured, either by solder or otherwise.

The external surface of each contact 47 is preferably provided with a shallow depression 48, for a purpose presently to be described.

After all the lamps have been inserted into the carrier 29, in association with the insulating insert and the metal contacts 47, the carrier presents an appearance as shown most clearly in Figure 9. In this condition it may be handled as a self-contained unit capable of application and withdrawal, at will, into and out of association with the optical instrument. When inserted into the housing, it is intended to be rotatively movable about an axis that is parallel to but offset from the optical axis of the instrument.

Figure 11:
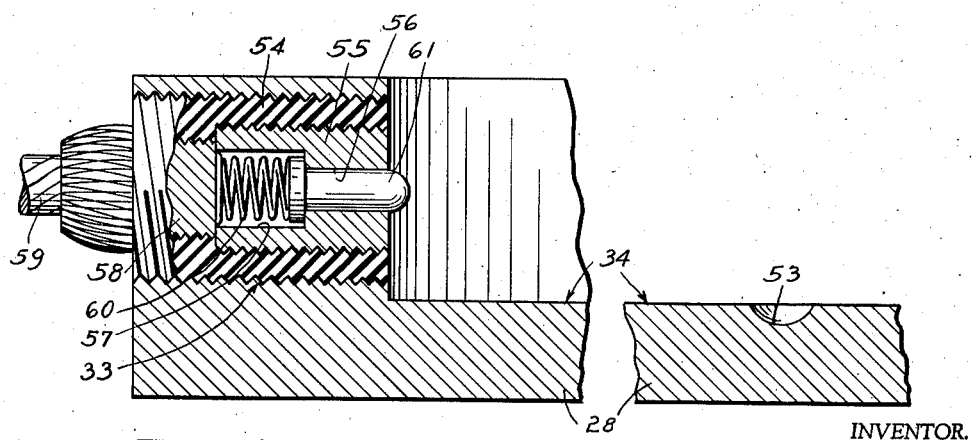
Figure 11 is an enlarged cross-sectional view taken substantially along the line 11—11 of Figure 8.

To retain the carrier in releasable rotative engagement with the housing, I provide a yieldable resilient means which is most clearly shown in Figures 10 and 11. It will be observed that an opening 49 is formed in the underside of the carrier 29 at the center of the carrier. A compression spring 50 may be mounted in this opening, together with a journal element in the form of a ball 51. The outer thinned ends of the opening 49 are turned inwards as at 52 to allow the ball or journal 51 to project slightly beyond the undersurface 36 of the carrier under the urgence of the spring 50. In the adjacent parallel surface 34, i. e., in the floor of the recess within which the carrier is accommodated, I provide a bearing in the form of a slight depression 53.

When the carrier is inserted into the housing, the spring-pressed journal 51 snaps into engagement with the bearing recess 53 as soon as the carrier is properly positioned. The carrier is then ready for rotative movements, and the journal 51 serves as an efficient guide or pivot for these movements. Bodily removal of the carrier is readily accomplished by merely applying a slight pulling force, whereby the ball 51 disengages itself from the depression 53 and allows the carrier to be withdrawn laterally from the instrument.

Referring now to Figure 11, it will be observed that I have shown an insulating bushing 54 within the bore 33. If this bore is threaded, the bushing may be similarly threaded to facilitate its insertion. Carried by the insulating bushing 54 is a conductive element 55 having a reduced bore portion 56 at its inner end and a slightly enlarged bore portion 57 in its outer end. A conductive terminal member 58 is adapted to establish contact with the conductive element 55. The terminal member 58 is in electrical connection with a conductive lead wire 59 adapted to establish connection with any suitable source of electric energy (not shown).

The bore 57 is adapted to accommodate a compression spring 60 which constantly presses upon the rear end of a contact element 61 whose end is rounded and projects slightly into the recess within which the carrier moves. The contact 61 constitutes a relatively fixed contact with which the contacts 47 successively engage.

The lamps are so mounted in the carrier that rotative movements of the carrier will bring the lamps successively into an operative position in substantial alignment with the optical axis of the instrument. In the illustrated device, this optical axis is coincident with the longitudinal axis of the substantially cylindrical housing 20, so that the operative lamp position is substantially coincident with the longitudinal axis of the housing. Any lamp that is so positioned will lie directly behind the screen or reticle 23 and will cast its light upwardly through the reticle and toward the lens system.

It will be observed that the construction provides a means for automatically completing an electric circuit to whatever lamp occupies the operative position within the housing 20. In Figure 8, for example, the lamp designated by the reference numeral 62 is in the operative position and is automatically energized by virtue of the engagement between its corresponding contact 47 and the relatively fixed contact 61. The other lamps are momentarily insulated from the live contact 61 and are thus inoperative. The position of the carrier shown in Figure 8 is thus one of several predetermined settings. Should the lamp 62 burn out or become otherwise unsuitable for further use, it is merely necessary to shift the carrier to bring the adjacent lamp 63 into the operative position. When that has been accomplished the carrier is in a second predetermined setting. There will be as many settings as there are lamps, and it will be obvious that a varying number of lamps may be supported by the carrier.

In accordance with my invention, I also provide cooperable positioning elements carried by the lamp carrier and the housing respectively for accurately holding the carrier in the predetermined settings to which reference has been made. These positioning elements are constituted, in the preferred embodiment, by the contacts 47 and 61, these contacts thus serving a dual purpose. As positioning elements, the contact 61 serves as a detent and defines a yieldable projecting element while each of the contacts 47 defines a cooperating element whose depression 48 is adapted to receive the detent.

Figure 1:
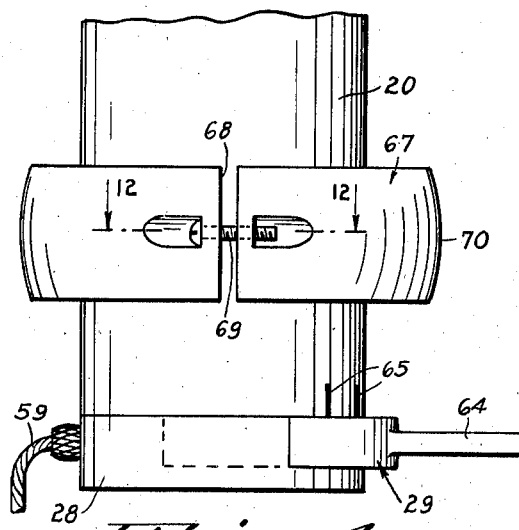
Figure 1 is a fragmentary elevational view of a gun sight embodying the features of the present invention.
Figure 2:
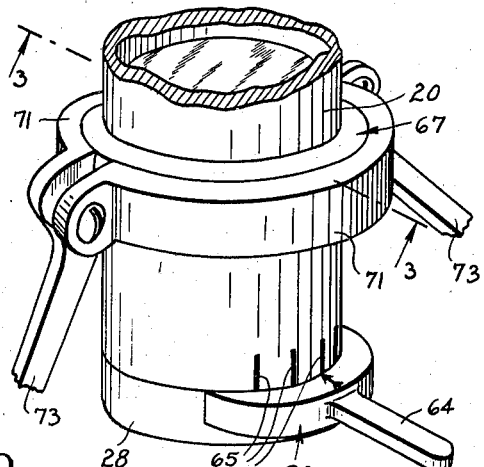
Figure 2 is a perspective view of the device of Figure 1, showing one manner of ultimate installation.

To facilitate the movements of the carrier, it is provided with a handle portion 64 which extends out of the recess in the housing, as shown for example in Figures 1 and 2. It is also preferable, though not essential, to provide cooperating indicia on the carrier and housing to indicate the setting in which the carrier is positioned. I have illustratively shown a series of lines or markings 65 on the housing 20 directly adjacent to the carrier 29, and I have shown on the upper surface 35 of the carrier 29 an arrow or similar marking 66 (see Figure 9) which registers with one or another of the lines 65 as the carrier is shifted from setting to setting.

Figure 3:
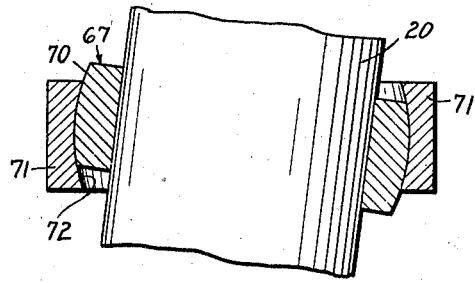
Figure 3 is a cross-sectional view taken substantially along the line 3—3 of Figure 2.

Referring now to Figures 1, 2, and 3, it will be observed that the housing is substantially cylindrical and that I have shown a mounting ring 67 encircling it. This ring is split as at 68, and the two ends are held in adjustable relationship by means of a suitable screw or clamping member 69. By adjusting the element 69, with the aid of a suitable tool, the ring 67 may be loosened to a sufficient extent to allow it to be shifted longitudinally on the housing 20. When the desired relative position has been reached, an adjustment of the element 69 will restore the ring 67 into firmly clamped relationship to the housing 20.

It will be observed that the outer surface 70 of the mounting ring 67 is shaped to conform to a spherical surface. This permits it to be adjustably installed within a suitable frame 71 having an inner surface 72 of corresponding spherical shape. The frame or support 71 may be of any desired character, and will be constructed to meet the particular requirements of the airplane, gun, or other location in which the gun sight is to be installed. I have illustratively shown the support 71 in the form of two semicircular clamp portions held in adjustable relationship to each other and mounted on legs 73 or other suitable supporting elements.

Figure 12:
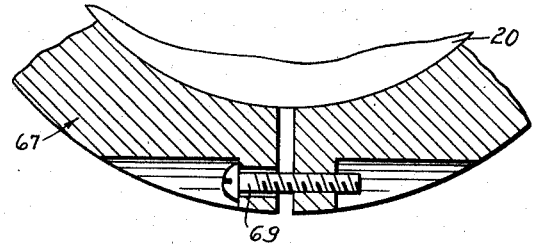
Figure 12 is a detail cross-sectional view taken substantially along the line 12—12 of Figure 1.

By virtue of the spherical surface 70, the instrument may be freely adjusted, as indicated in an exaggerated manner in Figure 3, whereby the desired accurate alignment or disposition may be achieved during the process of installation. So that this adjustment may be readily accomplished, the clamping element 69 is arranged wholly within the confines of the spherical surface 70, as shown in Figure 12.

While the advantages of the present invention will be obvious from the foregoing description so far as optical instruments in general are concerned, its particular value and utility in connection with gun sights will be pointed out.

Assuming that the gun sight is to be installed in an airplane, the mounting ring 57 is first adjusted on the housing so that the installation will not interfere with other devices or dials on the instrument panel, and so that the upper or sighting end of the device (not shown in the present drawings) will be at the desired height. The mounting ring is then clamped to the housing, and the instrument is then adjusted one way or another, as indicated in Figure 3, until the desired alignment with the gun or guns is achieved. The frame 71 is then adjusted so as to lock the instrument firmly in proper installed position.

When the gun sight is to be used, suitable connections are made so that electric current is fed through the lead 59. This will cause illumination of the lamp that is in the operative position within the housing. So long as the lamp functions properly, the gun sight may be continuously used to aim the gun or guns with which it has been aligned. Upon failure of the lamp, for any reason, the pilot merely reaches for the handle 64 and shifts the lamp carrier to a different predetermined setting, thereby almost instantaneously effecting a lamp replacement.

In the event that all of the lamps in any carrier are ultimately rendered useless, the entire lamp carrier may be replaced by merely grasping the handle 64, pulling the carrier bodily from the gun sight, and inserting a fresh carrier in its place.

From the standpoint of the manufacturer, it is contemplated that the gun sight will be furnished with a series of reticles, depending upon the possible uses to which it may be put. The United States Army, for example, is accustomed to the use of certain markings which are different from those customarily used by the United States Navy. A reticle of each kind may be furnished with the instrument, and prior to its installation, the desired reticle is readily inserted by merely removing the back portion 28 of the housing, screwing the desired reticle into position, and then replacing the back portion 28.

It will be understood that the embodiment herein illustrated has been shown merely by way of example and that various modifications will readily suggest themselves to those skilled in the art. For example, the lamp carrier need not necessarily have a circular periphery adapting it for rotative movements. It may obviously be constructed so as to allow for shifting movements along a straight line.

Similarly, while the invention is designed primarily for lamp-replacement purposes, it may obviously have applicability in cases where fuses or similar elements are to be replaced from time to time.

The applicability of the invention to optical instruments in the surgical or diagnostic field, or wherever lamps, fuses, or analagous elements require replacement at intervals of time, is also within the purview of my invention and will be obvious from the disclosure and description herein contained.

In general, it will be understood that the details herein described and illustrated may be readily modified by those skilled in the art without departing from the spirit and scope of the invention as expressed in the appended claims. For this reason, it is intended that these details be interpreted as illustrative, and not in a limiting sense.

Having thus described my invention and illustrated its use, what I claim as new and desire to secure by Letters Patent is:

1. In an optical instrument which includes an electric lamp as a functional part thereof, a housing, a carrier for a plurality of lamps, said housing having a recess to accommodate said carrier and to support it for movement into predetermined different settings in each of which a different one of said lamps assumes an operative position within the housing, and said carrier being constructed as a separate removable unit adapted to be inserted into said recess from the exterior of the instrument, whereby said carrier may be instantly replaced when desired.

2. In an optical instrument, the combination with the elements set forth in claim 1, of cooperable positioning elements carried by said carrier and housing respectively for accurately holding said carrier in said predetermined settings, said positioning elements comprising one which is a yieldable projecting element and a cooperating one which has a depression adapted to receive said projecting element.

3. In an optical instrument, the combination of elements set forth in claim 1, said carrier being disc-shaped and provided with lamp cradles opening into one face of the disc, each cradle accommodating one of said lamps.

4. In an optical instrument, the combination of elements set forth in claim 1, said carrier being disc-shaped and provided with lamp cradles opening into one face of the disc, each cradle accommodating one of said lamps, and electric contacts mounted in mutually insulated relationship on the periphery of said disc, each contact being electrically connected to one of said lamps.

5. In an optical instrument, the combination of elements set forth in claim 1, said carrier being disc-shaped and of circular contour and provided with lamp cradles opening into one face of the disc, each cradle accommodating one of said lamps, and said recess being of complementary contour to permit the movements of the carrier to be rotative in character.

6. In an optical instrument, the combination with the elements set forth in claim 1, of means for completing an electric circuit to whatever lamp occupies said operative position, said means comprising a plurality of mutually insulated electric contacts carried by said carrier and electrically connected with said lamps respectively, and a relatively fixed complementary contact carried by the housing and positioned so as to be successively engaged by said lamp contacts as the carrier is moved from one of said predetermined settings to another.

7. In an optical instrument, the combination with the elements set forth in claim 1, of means for completing an electric circuit to whatever lamp occupies said operative position, said means comprising a plurality of mutually insulated electric contacts carried by said carrier and electrically connected with said lamps respectively, and a relatively fixed complementary contact carried by the housing and positioned so as to be successively engaged by said lamp contacts as the carrier is moved from one of said predetermined settings to another, said contacts being so constructed that they serve also as cooperable positioning elements for accurately holding the carrier in said predetermined settings, said positioning elements comprising one which is a yieldable projecting element and a cooperating one which has a depression adapted to receive said projecting element.

8. In an optical instrument, the combination of elements set forth in claim 1, said carrier having a wall which is of circular contour and said recess having a curved wall of complementary contour against which the carrier wall abuts during movements of the carrier, whereby said movements are rotative in character and are guided by virtue of said abutment of said walls.

9. In an optical instrument, the combination of elements set forth in claim 1, said carrier having a wall which is of circular contour, said recess having a curved wall of complementary contour against which the carrier wall abuts during movements of the carrier, whereby said movements are rotative in character and are guided by virtue of said abutment of said walls, and a yieldable resilient means for retaining the carrier in releasable engagement with the housing.

10. In an optical instrument which includes an electric lamp as a functional part thereof, a housing, a carrier for a plurality of lamps, said housing having a recess to accommodate said carrier and to support it for rotative movement into predetermined different settings in each of which a different one of said lamps assumes an operative position within the housing, said carrier being constructed as a separate removable unit adapted to be inserted into said recess from the exterior of the instrument, and a yieldable resilient means for retaining the carrier in releasable rotative engagement with the housing when so inserted, whereby said carrier may be instantly replaced when desired.

11. In an optical instrument, the combination of elements set forth in claim 10, said recess and carrier having adjacent contacting surfaces and said yieldable resilient means comprising a bearing formed in one of said surfaces and a spring-pressed journal in the other.

FREDERICK CHARLES WAPPLER.